United States Patent  [15] 3,676,447
Skinner et al.  [45] July 11, 1972

[54] 3,4,5-TRIMETHOXYBENZAMIDES OF PHENYL-AND PYRIDYLAKYLAMINES

[72] Inventors: Wilfred A. Skinner, Portola Valley; John G. Johansson, Palo Alto; Howard L. Johnson, Sunnyvale, all of Calif.

[73] Assignee: Stanford Research Institute, Melo Park, Calif.

[22] Filed: June 24, 1970

[21] Appl. No.: 49,518

[52] U.S. Cl. ............260/295 AM, 260/294.8 G, 260/340.5, 260/559 R, 260/559 T, 424/266, 424/282, 424/320
[51] Int. Cl. .....................................................C07d 31/44
[58] Field of Search ....................260/294.8 G, 559 R, 559 T, 260/295 AM, 340.5

[56] References Cited

UNITED STATES PATENTS 2,870,156   1/1959   Perron et al. .........................260/295

*Primary Examiner*—Alan L. Rothman
*Attorney*—Donovan J. De Witt and Gregg, Hendricson & Caplan

[57] ABSTRACT

3,4,5-Trimethoxybenzamides of pyridylalkylamines such as pyridylmethylamine and of phenylalkylamines such as phenylmethylamine, phenethylamine and β-hydroxyphenethylamine, as well as derivatives thereof wherein the aromatic nucleus in the amine is substituted by one or more hydroxy, carboxy, halo, aryl, alkyl, nitro, alkoxy, aryloxy or thioalkoxy groups. The compounds are relatively non-toxic and are useful for pharmacological purposes. They exert a specific effect on the central nervous system and a somewhat lesser effect on muscle function. They are useful as relatively mild tranquilizers in the control of anxiety states, excessive aggressiveness and hyperactivity.

22 Claims, No Drawings

3,4,5-TRIMETHOXYBENZAMIDES OF PHENYL- AND PYRIDYLAKYLAMINES

SUMMARY OF THE INVENTION

The novel compounds of the present invention are those of the formula

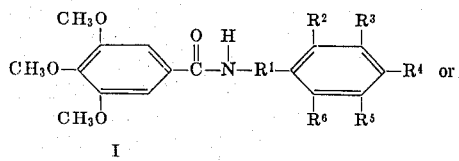

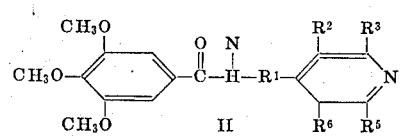

wherein $R^1$ represents a divalent methylene, ethylene or β-hydroxy ethylene group, and wherein the $R^2$, $R^3$, $R^4$, $R^5$ and $R^6$ groups, of which at least two are hydrogen, are selected from the group consisting of hydrogen, halo, alkyl, aryl, alkoxy, thioalkoxy, carboxy, aryloxy, hydroxy and nitro, as well as methylenedioxy, in which latter case the group collectively represents two adjacent $R^2$, $R^3$, $R^4$, $R^5$, or $R^6$ groups. As employed herein, the term "alkyl" and its derivative expressions designate a straight or branched chain alkyl group containing from one to four carbon atoms, inclusive, such as methyl, ethyl, propyl, isopropyl, butyl or isobutyl. The term "aryl" and its derivative expressions designate aryl groups and alkyl substituted aryl groups, (both aralkyl and alkaryl) all containing a total of from six to eight carbon atoms, inclusive, such as benzyl, phenyl, tolyl or xylyl. The term "halogen" refers to the elements chlorine, bromine, fluorine and iodine.

The novel compounds of this invention are white solids, of distinct melting point, which are soluble in some degree in benzene, petroleum ether, ethyl ether, ethanol and other organic solvents, and which are substantially insoluble in water. They are relatively non-toxic and have utility in pharmacological applications. Thus, they can be employed in living mammals as tranquilizers for the treatment and control of anxiety, excessive aggressiveness and hyperactivity.

The compounds of the present invention can be prepared by reacting 3,4,5-trimethoxybenzoyl chloride with the appropriate amine reactant. In one such method, set forth in detail below in Example I, the benzoyl chloride is reacted with the amine in the presence of potassium carbonate in a solvent such as benzene, there being employed approximately 1 mole of the benzoyl chloride for each amine moiety of the amine reactant which can if desired, by employed in excess. The reaction mixture is first stirred at room temperatures for about one-half to four or more hours, following which the solution is heated under reflux conditions for an additional period of about one-half to three or more hours. The solvent is then stripped off, leaving a residue which is washed first with water than with a 5 percent solution of hydrochloric acid and finally with a 10 percent solution of sodium carbonate. The residue is taken up in benzene and is re-crystallized therefrom. In another method, which is set forth in detail below in Example 2, the amine is reacted with the benzoyl chloride using approximately a 100 percent mole excess of the amine, said excess serving to take up the hydrogen chloride bi-product formed during the reaction. In this operation, the reactants, in a solvent such as benzene, are stirred at room temperatures for several hours, following which the solution is washed first with 5 percent hydrochloric acid, then with 10 percent sodium carbonate and finally with water. The solvent is then stripped off, following which the product is taken up in and recrystallized from a suitable solvent such as benzene or benzene admixed with ethanol, cyclohexane or the like.

The 3,4,5-trimethyoxybenzoyl chloride employed as a starting material is available commercially from Aldrich Chemical Company, Inc., Milwaukee, Wisconsin, and others. It can be prepared in a conventional fashion by reacting 3,4,5-trimethoxybenzoic acid with an excess of thionyl chloride in a solvent such as chloroform or benzene, the reaction proceeding readily at reflux temperatures. The product can be recovered by stripping off the solvent along with decomposition products of the excess thionyl chloride.

The amine compounds which are employed as starting materials can be prepared by methods which are well known to those skilled in the art. For example, those of the amines wherein $R^1$ is a β-hydroxyethylene group can be prepared by one or another of the two following methods. The first such method involves reacting the corresponding acetophenone compound (containing the desired $R^2$, $R^3$, $R^4$, $R^5$ and $R^6$ substituent groups) with an approximately equimolar amount of trimethylphenylammonium tribromide in a solvent such as tetrahydrofuran to form the corresponding α-bromoacetophenone intermediate. This reaction takes place at room temperatures as the reaction mixture is stirred for a number of hours, following which the brominated phenone compound is recovered by stripping off the solvent and recrystallizing the compound from a suitable solvent such as mixed ethanol-petroleum ether. The bromo intermediate is then reacted with an excess of sodium azide in methanol for several hours at room temperatures, following which the solvent is stripped off, water is added and the product is extracted with ethyl ether. The ether phase is dried (anhydrous $Na_2SO_4$) and the solvent is evaporated off, leaving the corresponding azide intermediate. This is then reduced with either lithium hydride or sodium borohydride followed by catalytic reduction with platinum oxide. When using platinum oxide, reduction is affected at room temperatures and atmospheric pressures in ethanol, following which the solvent is stripped off and the product is taken up in 1N HCl. After being washed with ethyl ether, the acid solution is made alkaline with sodium carbonate and extracted with ethyl ether. The ether phase is then dried ($Na_2SO_4$) and the ether evaporated to leave the desired amine product. The reduction step with lithium aluminum hydride is described in the method to follow.

In the other method a benzaldehyde starting compound is converted to the corresponding cyanohydrin by reaction with sodium acid sulfite and sodium cyanide, using the method of Levine et al, Jnl. Chem. Soc. 70, 1930 (1948). The cyanohydrin is then converted to the desired hydroxyphenethylamine by reduction with lithium aluminum hydride using the method of G.I. Poos et al, Jnl. Med. Chem. 6, 266 (1963).

In preparing amines wherein $R^1$ is methylene or ethylene, the corresponding phenylacetonitrile or phenylpropionitrile compound is catalytically reduced to the desired amine product using Raney nickel in ammonia-saturated ethanol.

Representative amine compounds which can be employed to react with the 3,4,5-trimethoxybenzoyl chloride include the following:

β-hydroxy-β-phenethylamine
phenylmethylamine
β-phenethylamine
4-(aminomethyl)-pyridine
4-(aminoethyl)-pyridine
4-(aminomethyl)-2-methoxypyridine
(3,5-dimethoxyphenyl)-ethylamine
β-(p-ethoxyphenyl)-β-hydroxyethylamine
β-(3,4,5-trimethoxyphenyl)-β-hydroxyethylamine
β-(4-biphenylyl)-β-hydroxyethylamine
β-(p-methoxyphenyl)-β-hydroxyethylamine
β-(o-chlorophenyl)-β-hydroxyethylamine
β-(m-bromophenyl)-β-hydroxyethylamine
β-(3,4-methylenedioxyphenyl)-β-hydroxyethylamine
β-(3-fluoro-4-methoxyphenyl)-β-hydroxyethylamine
β-(2,6-dichlorophenyl)-β-hydroxyethylamine
β-(2,5-dimethoxyphenyl)-β-hydroxyethylamine
β-(p-isopropylphenyl)-β-hydroxyethylamine
β-(3-methoxy-4-ethoxyphenyl)-β-hydroxyethylamine
β-(m-methoxyphenyl)-β-hydroxyethylamine
β-(o-methoxyphenyl)-β-hydroxyethylamine β-(2,4-dimethoxyphenyl)-β-hydroxyethylamine
β-(3,4-dibenzyloxyphenyl)-β-hydroxyethylamine
β-(o-methylphenyl)-β-hydroxyethylamine
β-(o-bromophenyl)-β-hydroxyethylamine
(3-carboxy-4-hydroxyphenyl)-methylamine
β-(2-hydroxy-3-methoxyphenyl)-β-hydroxyethylamine
β-(2,6-dimethoxyphenyl)-β-hydroxyethylamine
β-(3,4,5-trimethoxyphenyl)-ethylamine
4-(amino-β-hydroxyethyl)-pyridine
4-(amino-β-hydroxyethyl)-picolinic acid
4-amino-β-hydroxyethyl)-2-chloropyridine
4-(aminomethyl)-2-nitropyridine
4-(aminomethyl)-2-thiomethoxy pyridine
β-(p-thiomethoxyphenyl)-β-hydroxyethylamine
β-(m-nitrophenyl)-β-hydroxyethylamine
β-(m-xylylphenyl)-β-hydroxyethylamine
β-(p-tolylphenyl)-β-hydroxyethylamine
β-(o-iodophenyl)-β-hydroxyethylamine

DESCRIPTION OF PREFERRED EMBODIMENTS

The following examples are merely illustrative of the invention and are not to be construed as limiting.

Example 1

3,4,5-trimethoxybenzamide of β-(p-ethoxphenyl)-β-hydroxyethylamine 3,4,5-trimethoxybenzoyl chloride in the amount of 2.3 g (0.01 mole) is dissolved in 125 ml of benzene along with 3 g (0.016 mole) of β-(p-ethoxyphenyl)-β-hydroxyethylamine and 3 g of potassium carbonate to take up the HCl found during the reaction. The reaction mixture is stirred for 5 hours at room temperature, following which the benzene is distilled off and the product is washed first with water, then with a 5 percent hydrochloric acid solution and finally with a 10 percent sodium carbonate solution. The product is then taken in benzene and recrystallized therefrom, there being recovered 1.4 g of a white solid having a melting point of 136°–138° C. which is soluble in benzene, ethanol and other organic solvents and substantially insoluble in water. The identity of the product is confirmed by elemental analysis which discloses the compound to be one having carbon, hydrogen and nitrogen contents of 63.62, 6.80 and 3.65 percent, respectively, versus calculated values of 63.99, 6.71 and 3.73 percent, respectively, for these elements in the amide compound forming the caption of this example.

Example 2

3,4,5-trimethoxybenzamide of β-hydroxy-β-phenethylamine 3,4,5-trimethoxybenzoyl

In this operation, 3.46 g (0.015) of 3,4,5-trimethoxybenzoyl chloride is dissolved in 125 ml of benzene along with 4.12 g (0.03 mole) of β-hydroxy β-phenylethylamine. The resulting solution is stirred at room temperatures for 5 hours, with small amounts of benzene being added from time to time to keep the formed amide in the solution. The solution is then washed first with 5 percent hydrochloric acid, then with 10 percent sodium carbonate and finally with water. The solvent is then evaporated and the residue is taken up in benzene and recrystallized therefrom, there thus being recovered a 3.4 g of a white solid having a melting poing of 98.5°–99.5° C. which is soluble in benzene, ethyl ether and other organic solvents and substantially insoluble in water. The identity of the compound is confirmed by elemental analysis which discloses it to be one having carbon, hydrogen and nitrogen contents of 65.06, 6.37 and 4.14 percent, respectively versus calculated values of 65.24, 6.39 and 4.23 percent, respectively, for these elements in the amide compound which forms the caption of this example.

In the following examples, the 3,4,5-trimethoxybenzoyl chloride is reacted with the indicated amine to form the captioned amide. In each case the method used is substantially that of Example 2 except where the method is indicated to be that of Example 1. All the compounds are soluble in organic solvents and not soluble in water.

EXAMPLE 3

3,4,5-trimethoxybenzamide of β-(3,4,5-trimethoxyphenyl)-β-hydroxyethylamine

Using substantially the method of Example 1, the captioned amide is obtained as a white solid having a melting point of 152°–154° C. The identity of the compound is confirmed by elemental analysis. C,H,N; found: 59.77, 6.56, 3.55; calculated: 59.85, 6.46 and 3.32.

EXAMPLE 4

3,4,5-trimethoxybenzamide of β-(4-biphenylyl)-β-hydroxyethylamine

Following substantially the procedure of Example 1, the foregoing compound is obtained as a white solid having a melting point of 169°–170° C. C,H,N; found: 70.56, 6.27, 3.53; calculated: 70.74, 6.18 and 3.44 percent.

EXAMPLE 5

3,4,5-trimethoxybenzamide of β-(p-methoxyphenyl)-β-hydroxyethylamine

The foregoing compound is obtained as a white solid having a melting point of 113°–114° C. C,H,N; found: 63.00, 6.44, 3.67; calculated: 63.15, 6.41 and 3.88 percent.

EXAMPLE 6

3,4,5-trimethoxybenzamide of β-(o-chlorophenyl)-β-hydroxyethylamine

The foregoing compound is obtained as a white solid having a melting point of 98.5°–10° C. C,H,N; found: 59.01, 5.70, 3.68; calculated: 59.3, 5.50 and 3.82 percent.

EXAMPLE 7

3,4,5-trimethoxybenzamide of β-(m-bromo-phenyl)-β-hydroxyethylamine

Following substantially the procedure of Example 1, the foregoing compound is obtained as a white solid having a melting point of 122.5°–124.5° C. C,H,N; found: 53.13, 5.10, 3.34; calculated: 52.8, 4.92 and 3.46 percent.

EXAMPLE 8

3,4,5-trimethoxybenzamide of β-(3,4-methyl-enedioxyphenyl)-β-hydroxyethylamine

The foregoing compound is obtained as a white solid having a melting point of 102°–104° C. C,H,N; found: 60.57, 5.70, 3.57; calculated: 60.79, 5.64 and 3.73 percent.

EXAMPLE 9

3,4,5-trimethoxybenzamide of β-(3-fluoro-4-methoxyphenyl)-β-hydroxyethylamine

Following substantially the procedure of Example 1, the foregoing compound is obtained as a white solid having a melting point of 120.5°–121.5°C. C,H,N; found: 60.00, 5.99, 3.70; calculated: 60.21, 5.85 and 3.70 percent.

EXAMPLE 10

3,4,5-trimethoxybenzamide of β-(2,6-dichlorophenyl)-β-hydroxyethylamine

The foregoing compound is obtained as a white solid having a melting point of 100°–102° C., and containing 1 mole of water of hydration. Including this water, the values obtained by elemental analysis are as follows: C,H,N; found: 51.48, 5.15, 3.23; calculated: 51.7, 5.05 and 3.35 percent.

EXAMPLE 11

3,4,5-trimethoxybenzamide of β-(2,5-dimethoxyphenyl)-β-hydroxethylamine

The foregoing compound is obtained as a white solid having a melting point of 166.5°–167° C. C,H,N; found: 61.52, 6.32, 3.56; calculated: 61.37, 6.44 and 3.58.

EXAMPLE 12

3,4,5-trimethoxybenzamide of β-(p-isopropylphenyl)-β-hydroxyethylamine

Using substantially the procedure of Example 1, the foregoing compound is obtained as a white solid having a melting point of 128°–128.5° C. C,H,N; found: 67.30, 7.38, 3.61; calculated: 67.54, 7.29 and 3.75 percent.

EXAMPLE 13

3,4,5-trimethoxybenzamide of β-(3-methoxy-4-ethoxyphenyl)-β-hydroxyethylamine

Using substantially the procedures of Example 1, the foregoing compound is obtained as a white solid having a melting point of 145°–146° C. C,H,N; found: 61.88, 6.76, 3.40; calculated: 62.21, 6.71 and 3.45 percent.

EXAMPLE 14

3,4,5-trimethoxybenzamide of β-(m-methoxyphenyl)-β-hydroxyethylamine

The foregoing compound is obtained as a white solid having a melting point of 98.5°–99.5° C C,H,N; found: 62.85, 6.64, 3.81; calculated: 63.15, 6.41 and 3.88 percent.

EXAMPLE 15

3,4,5-trimethoxybenzamide of β-(o-methoxyphenyl)-β-hydroxyethylamine

The foregoing compound is obtained as a white solid having a melting point of 155°–155.5° C. C,H,N; found: 62.76, 6.36, 3.84; calculated: 63.15, 6.41 and 3.88 percent.

EXAMPLE 16

3,4,5-trimethoxybenzamide of β-(2,4-dimethoxyphenyl)-β-hydroxyethylamine

The foregoing compound is obtained as a white solid having a melting point of 148°–149° C. C,H,N; found: 61.49, 6.56, 3.68; calculated: 61.37, 6.44 and 3.58 percent.

EXAMPLE 17

3,4,5-trimethoxybenzamide of β-(o-fluorophenyl)-β-hydroxyethylamine

The foregoing compound is obtained as a white solid having a melting point of 111°–112° C. C,H,N; found: 62.02, 5.99, 4.09; calculated: 62.0, 5.78 and 4.01 percent.

EXAMPLE 18

2,3,5-trimethoxybenzamide of β-(2-hydroxy-3-methoxyphenyl)-βhydroxyethylamine

Using substantially the procedures of Example 1, the foregoing compound is obtained as a white solid having a melting point of 180°–181.5° C. C,H,N; found: 60.46, 6.21, 3.70; calculated: 60.47, 6.14 and 3.71 percent.

EXAMPLE 19

3,4,5-trimethoxybenzamide of β-(3,4-dibenzyloxyphenyl)-β-hydroxyethylamine

The foregoing compound is obtained as a white solid having a melting point of 147°–147.5° C. C,H,N; found: 70.75, 6.26, 2.69; calculated: 70.70, 6.12 and 2.58 percent.

EXAMPLE 20

3,4,5-trimethoxybenzamide of β-(o-methylphenyl)-β-hydroxyethylamine

The foregoing compound is obtained as a white solid having a melting point of 84.5°–86.5° C. C,H,N; found: 65.78, 6.72, 4.12; calculated: 66.07, 6.71 and 4.06 percent.

EXAMPLE 21

3,4,5-trimethoxybenzamide of β-(o-bromo-phenyl)-β-hydroxyethylamine

The foregoing compound is obtained as a white solid having a melting point of 121°–122° C. C,H,N; found: 52.49, 5.02, 3.56; calculated: 52.8, 4.92, and 3.46 percent.

EXAMPLE 22

3,4,5-trimethoxybenzamide of (3-carboxy-4-hydroxyphenyl)-methylamine

Following the procedure of Example 1, the foregoing compound is prepared as a white solid having a melting point of 206.5°–207.5° C. C,H,N; found: 59.83, 5.38 and 4.01; calculated: 59.83, 5.30 and 3.88 percent.

EXAMPLE 23

3,4,5-trimethoxybenzamide of β-(3,4,5-trimethoxyphenyl)-ethylamine

The foregoing compound is obtained as a white solid having a melting point of 183°–184° C. C,H,N; found: 62.51, 6.84, 3.61; calculated: 62.21, 6.71 and 3.45 percent

EXAMPLE 24

3,4,5-trimethoxybenzamide of β-(2,6-dimethoxyphenyl)-ethylamine

The foregoing compound is prepared as a white powder having a melting point of 193°–194° C. C,H,N; found: 63.86, 6.51 and 3.74; calculated: 63.99, 6.71 and 3.73 percent

EXAMPLE 25

3,4,5-trimethoxybenzamide of 4-(aminomethyl)-pyridine

The foregoing compound is obtained as a white powder having a melting point of 159°–162° C. C,H,N; found: 63.21, 5.87, 9.32; calculated: 63.56, 6.0 and 9.27 percent.

EXAMPLE 26

3,4,5-trimethoxybenzamide of β-(2,4,6-triiodophenyl)-ethylamine

The foregoing compound is obtained as a white powder having a melting point of 188°–189.5° C. This structure is confirmed by elemental analysis.

EXAMPLE 27

3,4,5-trimethoxybenzamide of 4-(amino-β-hydroxyethyl)-pyridine

The foregoing compound is obtained having a molecular weight of 332.36.

EXAMPLE 28

3,4,5-trimethoxybenzamide of 4-(amino-β-hydroxyethyl)-picolinic acid

The foregoing compound is obtained having a molecular weight of 376.37.

EXAMPLE 29

3,4,5-trimethoxybenzamide of 4-(amino-β-hydroxyethyl)-2-chloropyridine

The foregoing compound is obtained having a molecular weight of 366.81.

EXAMPLE 30

3,4,5-trimethoxybenzamide of 4-(aminoethyl)-2-nitropyridine

The foregoing compound is obtained having a molecular weight of 361.37.

EXAMPLE 31

3,4,5-trimethoxybenzamide of 4-(aminomethyl)-2-thiomethoxypyridine

The foregoing compound is obtained having a molecular weight of 348.42.

EXAMPLE 32

3,4,5-trimethoxybenzamide of β-(p-thiomethoxyphenyl)-β-hydroxyethylamine

The foregoing compound is obtained having a molecular weight of 377.47.

EXAMPLE 33

3,4,5-trimethoxybenzamide of β-(m-nitro-phenyl)-β-hydroxyethylamine

The foregoing compound is obtained having a molecular weight of 376.39.

EXAMPLE 34

3,4,5-trimethoxybenzamide of β-(m-xylylphenyl)-β-hydroxyethylamine

The foregoing compound is obtained having a molecular weight of 435.49.

EXAMPLE 35

3,4,5-trimethoxybenzamide of β-(p-tolyl-phenyl)-β-hydroxyethylamine

The foregoing compound is obtained having a molecular weight of 421.45.

EXAMPLE 36

3,4,5-trimethoxybenzamide of phenylmethylamine

The foregoing compound is obtained having a molecular weight of 301.35.

EXAMPLE 37

3,4,5-trimethoxybenzamide of β-phenethylamine

The foregoing compound is obtained having a molecular weight of 315.38.

EXAMPLE 38

3,4,5-trimethoxybenzamide of 4-(aminoethyl)-pyridine

The foregoing compound is obtained having a molecular weight of 316.36.

EXAMPLE 39

3,4,5-trimethoxybenzamide of 4-(aminomethyl)-2-methoxypyridine

The foregoing compound is obtained having a molecular weight of 332.36.

The compounds of this invention are useful as sedatives and are characterized, in general, by the fact that their effects on coordinated motor activity are independent of their effects on uncoordinated motor activity. Thus, when administered either orally or by injection into a mammal, said compounds are capable of providing a sedative effect without at the same time inducing a corresponding of properties makes the compounds well adapted to be employed in the treatment of anxiety states, excessive aggressiveness and hyperactivity.

In evaluating the degree and type of central nervous system depression exerted thereby, the compounds hereof were administered to mice and the resultant effects were determined by the photocell-activity-cage (uncoordinated motor activity) and the rotorod (coordinated motor activity) methods. These methods are essentially those which are described by Kinnard and Carr, Jnl. Pharmacol. Exptl. Therapy., 121, 354 (1957). In carrying out these determinations, male albino mice (17–20 g) of a Swiss-Webster strain were utilized, and were used only once. All drugs were administered intraperitoneally as suspensions in 10 percent Tween 80 in 0.9 percent saline (0.2 ml). Photocell activity was determined as cumulative counts over a 1 hour period beginning 0.5 hour after administration of drug or vehicle to groups of five mice. Activity was determined for one control group with each two treatment groups. Values for the latter were calculated as percentages of the former and are so expressed in the following table. Rotarod performance times were determined in groups of five trained mice 0.5 hour after administration of drug or vehicle. Mean performance time for control groups was 113.9 sec. and rod rotation as at the rate of 15 rpm. The mean performance times for the treated mice are expressed as a percentage of the control group performance time in the table.

The results obtained in the foregoing tests are expressed in the following table, wherein each test compound employed is designated by the particular Example hereof in which the compound is described.

| Compound (Example Number) | Dose Employed mg/kg of Body Weight | Photocell Activity Cage (% of Control) ± Std. Error | Rotorod (% of Control) |
|---|---|---|---|
| 3 | 100 | 31 ± 4 | 87 |
| 4 | 100 | 41 ± 8 | 82 |
| 5 | 50 | 49 ± 4 | 96 |
| 6 | 50 | 60 ± 5 | 97 |
| 12 | 50 | 37 ± 3 | 89 |
| 13 | 25 | 43 ± 2 | 75 |
| 14 | 150 | 25 ± 8 | 90 |
| 15 | 25 | 35 ± 9 | 85 |
| 16 | 100 | 32 ± 2 | 94 |
| 17 | 50 | 57 ± 14 | 99 |
| 18 | 25 | 36 ± 6 | 95 |
| 19 | 100 | 62 ± 10 | 90 |
| 23 | 100 | 47 ± 3 | 82 |
| 24 | 100 | 45 ± 9 | 90 |
| 25 | 50 | 42 ± 13 | 93 |
| 10 | 50 | 37 ± 4 | 85 |

We claim:

1. Compounds having the formula

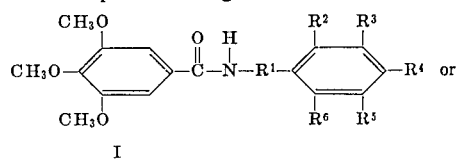

I

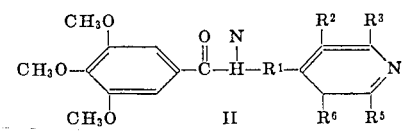

II wherein $R^1$ represents —$CH_2$ CH(OH)— and wherein $R^2$, $R^3$, $R^4$, $R^5$ and $R^6$, of which at least two are hydrogen, are selected from the groups consisting of hydrogen, halo, alkyl, aryl, alkoxy, thioalkoxy, carboxy, aryloxy, hydroxy, nitro and — $OCH_2O$ — groups, the term "alkyl" representing an alkyl group of from one to four carbon atoms and the term "aryl" representing aryl, alkaryl and aralkyl groups, all of from six to eight carbon atoms.

2. The compound of claim 1 which is the 3,4,5-trimethoxybenzamide of β-(p-ethoxphenyl)-β-hydroxyethylamine.

3. The compound of claim 1 which is the 3,4,5-trimethoxybenzamide of β-hydroxy-β-phenethylamine.

4. The compound of claim 1 which is the 3,4,5-trimethoxybenzamide of β-(3,4,5-trimethoxyphenyl)-β-hydroxyethylamine.

5. The compound of claim 1 which is the 3,4,5-trimethoxybenzamide of β-(3,4,5biphenylyl)-β-hydroxyethylamine.

6. The compound of claim 1 is the 3,4,5-trimethoxybenzamide of β-(p-methoxyphenyl)-β-hydroxyethylamine.

7. The compound of claim 1 which is the 3,4,5-trimethoxybenzamide of β-(o-chlorophenyl)-β-hydroxyethylamine.

8. The compound of claim 1 which is the 3,4,5-trimethoxybenzamide of β-(m-bromophenyl)-β-hydroxyethylamine.

9. The compound of claim 1 which is the 3,4,5-trimethoxybenzamide of β-(3,4-methylenedioxyphenyl)-β-hydroxyethylamine.

10. The compound of claim 1 which is the 3,4,5-trimethoxybenzamide of β-(3-fluoro-4-methoxyphenyl)-β-hydroxyethylamine.

11. The compound of claim 1 which is the 3,4,5-trimethoxybenzamide of β-(2,6-dichlorophenyl)-β-hydroxyethylamine.

12. The compound of claim 1 which is the 3,4,5-trimethoxybenzamide of β-(2,5-dimethoxyphenyl)-β-hydroxyethylamine.

13. The compound of claim 1 which is the 3,4,5-trimethoxybenzamide of β-(p-isopropylphenyl)-β-hydroxyethylamine.

14. The compound of claim 1 which is the 3,4,5-trimethoxybenzamide of β-(3-methoxy-4-ethoxyphenyl)-β-hydroxyethylamine.

15. The compound of claim 1 which is the 3,4,5-trimethoxybenzamide of β-(m-methoxyphenyl)-β-hydroxyethylamine.

16. The compound of claim 1 which is the 3,4,5-trimethoxybenzamide of β-(o-methoxyphenyl)-β-hydroxyethylamine.

17. The compound of claim 1 which is the 3,4,5-trimethoxybenzamide of β-(2,4-dimethoxyphenyl)-β-hydroxyethylamine.

18. The compound of claim 1 which is the 3,4,5-trimethoxybenzamide of β-(0-fluorophenyl)-β-hydroxyethylamine.

19. The compound of claim 1 which is the 3,4,5-trimethoxybenzamide of β-(2-hydroxy-3-methoxyphenyl)-β-hydroxyethylamine.

20. The compound of claim 1 which is the 3,4,5-trimethoxybenzamide of β-(3,4-dibenzyloxyphenyl)-β-hydroxyethylamine.

21. The compound of claim 1 which is the 3,4,5-trimethoxybenzamide of β-(o-methylphenyl)-β-hydroxyethylamine.

22. The compound of claim 1 which is the 3,4,5-trimethoxybenzamide of β-(o-bromophenyl)-β-hydroxyethylamine.

* * * * *